(12) United States Patent
Schutt (10) Patent No.: US 6,490,802 B1
(45) Date of Patent: Dec. 10, 2002

(54) ORIENTATION SENSOR

(76) Inventor: Randy L. Schutt, 2134 Perry St., Holland, MI (US) 49424

( * ) Notice: Subject to any disclaimer, the term of this patent is extended or adjusted under 35 U.S.C. 154(b) by 0 days.

(21) Appl. No.: 09/846,438

(22) Filed: May 2, 2001

(51) Int. Cl.[7] .............................. G01C 9/06; G01C 9/18
(52) U.S. Cl. .................................. 33/366.16; 33/366.17
(58) Field of Search ........................ 33/366.11, 366.12, 33/366.13, 366.15, 366.16, 366.17, 366.23, 366.24, 368, 378, 391, 392, 396

(56) References Cited

U.S. PATENT DOCUMENTS

| | | | |
|---|---|---|---|
| 3,899,834 A | * | 8/1975 | Harrison, Jr. ................ 33/352 |
| 3,956,831 A | * | 5/1976 | Sibley .......................... 33/352 |
| 4,627,172 A | * | 12/1986 | Afromowitz ............. 33/366.12 |
| 4,800,542 A | | 1/1989 | Franklin |
| 5,088,204 A | * | 2/1992 | Wolf ....................... 33/366.17 |
| 5,101,570 A | | 4/1992 | Shimura |
| 5,365,671 A | * | 11/1994 | Yaniger ....................... 33/365 |
| 5,425,179 A | * | 6/1995 | Nickel et al. ............ 33/366.16 |
| 5,704,130 A | | 1/1998 | Augutin |
| 5,774,996 A | * | 7/1998 | Ogawa et al. ........... 33/366.12 |
| 5,953,116 A | | 9/1999 | Ohtomo |

* cited by examiner

Primary Examiner—Diego Gutierrez
Assistant Examiner—Amy R Cohen
(74) Attorney, Agent, or Firm—F. Rhett Brockington (57) ABSTRACT

An apparatus for precisely measuring the direction and grade of tilt, and the rate of change of tilt. The apparatus consists of a lighted fiber optic cable that is fitted with a flotation collar on one end, and the other end is vertically tethered to the bottom of a liquid filled chamber. The light projecting from the cable is sensed by a photodetector and assigned spatial coordinates. The fiber optic cable is sensitive to changes in orientation, and when the apparatus is tilted, or subject to an acceleration, then the cable deflects to correct for the tilt, and the photodetector picks up the new spatial coordinates of the projecting light. The new spatial coordinates reflect the direction and magnitude of tilt.

19 Claims, 7 Drawing Sheets

ORIENTATION SENSOR

BACKGROUND OF THE INVENTION

The invention is an apparatus for determining orientation with respect to acceleration, and more particularly the invention is an apparatus for determining orientation with respect to gravity, and where the orientation can be determined statically or dynamically.

Orientation devices, sometimes referred to as levels, tilt devices or inclinometers, are similar, in that all measure at least one component of an angle of deflection from a true vertical, where the true vertical is defined as a direction that is coextensive with gravity. The angle of deflection is conventionally termed tilt, or angle of tilt. A simple device for determining the direction of gravity is a plumb line. A plumb line is a string or line having a weight attached to one end and the other end attached to a stationary point, such that the hanging weight is free to move. After being positioned, once the weight becomes stationary, the plumb line indicates the true vertical.

If an object is not level then this is another manifestation of being tilted. Unlevelness is how much a plane is deflected from a true horizontal, where the true horizontal is a plane that is perpendicular to true vertical. Many orientation devices measure tilt by measuring levelness. A bubble tube is a means of using a gravitational force to determine true vertical by measuring levelness. The bubble tube is based on the observation that an air bubble in a liquid will seek to escape that liquid, and that under the pull of gravity, the action route will take the air bubble to a position in the liquid of lowest gravitational influence, that is lowest pressure. This action occurs because the pressure drops as the bubble moves upward, enabling the bubble to expand. The expanded bubble continues to proportionately increase in buoyancy, and the process continues until the bubble is either restrained or it reaches the surface. When the bubble is in a horizontal liquid filled tube, where the tube is slightly arced upward, then the position of lowest gravitational influence is at the apex of the arc, and this coincides with true vertical for one planar component. If the bubble is displaced from the apex, then this indicates that the tube is tilted, because the highest point in the tube is displaced. An example of a commonly utilized tool that employs the bubble tube technique is a level. One bubble tube can measure only one axis component at a time, so to determine the tilt on the other axes the level either has two or more bubble tubes offset 90 degrees, or the user has to rotate the level through 90 degrees, taking measurements at each angle. Even then, unless the user knows exactly how to line up the level, the level could be actually rotated slightly, and thereby produce an erroneous level reading in the bubble tube. More recent inventions employing bubble tubes, often called electronic bubble tubes, have a domed chamber instead of a tube and the chamber has a shallow convex curvature. The convex curvature enables the air bubble to move in either the x or the y direction or any combination thereof, as it seeks the point of lowest pressure. However, the additional degree of freedom comes at a substantial price. The forces acting on the air bubble producing movement, are now spread over a much larger angle, instead along just one axis. Therefore, domed chambered bubble tubes are substantially less sensitive to small changes in tilt compared to tubes.

There are several considerations the user must be aware of when using orientation devices that use the bubble tube technique. Firstly, bubble tubes are subject to error because if either the tube or the apparatus seating the tube is rotated, a false orientation reading will be generated. Also, competing interfacial interactions can be substantial. By way of example, the reader is encouraged to recall the way small bubbles cling to the walls of a glass of water, or a glass of champagne. As previously implied, omni-directional bubble tubes offer the advantage of determining the direction of tilt with one measurement, but omni-directional bubble tubes are less sensitive than single axis bubble tubes. An improved technology would be an orientation sensor that had the convenience of measuring tilt through 360 degrees, but without the loss of sensitivity. Another limitation of the prior art is that to amplify small changes in tilt requires using a tube that is has very little arch. However, with a substantially straight tube the operative gravitational forces and the competing interfacial forces are approaching each other in magnitude, and the net result is that the bubble tends to stick and then jump, in an all or none fashion. An improved technique would be one that utilized the heretofore described action of the bubble to move to the point of lower pressure, while at the same time minimizing the interfacial interactions.

Kikuo Shimura U.S. Pat. No. 5,101,570 discloses an Inclination Angle Detector that is a bubble tube that casts a shadow on a circular detector, where the detector is divided into quadrants. The resulting electronic signal is converted/calculated into an angle of tilt or incline, where not only the degree or magnitude of tilt is determined, but also the direction.

Fumio Ohtomo U.S. Pat. No. 5,953,116 discloses a Tilt Detecting Device that is comprised of a bubble tube, light, detector and electronics. His invention is geared for survey equipment, i.e. transit theodolite. Page 11, FIG. 18 shows a light profile of the photo detector of the prior art. By using plates (slits) the overall light is reduced but the background noise light is greatly reduced, permitting accurate determinations.

Franklin U.S. Pat. No. 4,800,542 discloses an orientation device that uses moving mercury to change the capacitance in response to a change in orientation.

Augutin U.S. Pat. No. 5,704,130 discloses an invention developed for Bayer that uses a chamber containing two immiscible media, where one of the media is either a gas, liquid or solid. The preferred invention uses a gas.

SUMMARY OF THE INVENTION

The invention is an apparatus for measuring tilt, where tilt can generally be described as an angular component of a vector, where the vector is equal and opposite the force exerted by gravity and, on occasion, one or more additional forces. The angular component or tilt is three dimensional. The three angular dimensions can be measured and described in a two dimensional format. Two of the dimensions are described in terms of direction and the third dimension in terms of magnitude. The format can use purely scalar units, purely angular-units or a blend of units, such as polar notation. The reader is encouraged to preview FIG. 4 for a pictorial explanation of tilt. In the current discussion, for purposes of clarity, the direction of tilt will refer to the orientation of a substantially horizontal plane where the tilt is steepest. The magnitude will refer to the grade of that horizontal plane.

The invention is set up to adhere to this format, which has a visual representation that is easily understood, and is grounded with an historical basis Mechanistically, the invention uses the observed action of a buoyant element immersed in a liquid to seek a position of minimum pressure to determine orientation. Under static conditions, that position is as close to the surface as permitted by the constraints of the invention. The action is not dissimilar to the bubble tube, but with several significant departures that all but eliminate some of the more onerous limitations associated with the prior art.

The invention is an apparatus for determining the orientation with respect to gravity, wherein the apparatus comprises:

a lower chamber that is filled with a liquid, and an upper chamber that is superimposed over the lower chamber, where the lower chamber and the upper chamber share a light communicating wall, where said light communicating wall is a window;

a light transmitting cable that is transmitting light through the cable, wherein said cable has a source end which is an entrance point for the light, and an exit end that has an emitting light, and where the exit end is fitted with a flotation collar;

a light source;

an observing means in the upper chamber for detecting the position of the emitting light, where the observing means can be a visual eye portal, a lens or an instrumental means, such as a photodetector that generates an electronic signal, where the photodetector has a supporting electronic circuit, where the electronic signal is unique to a spatial coordinate;

wherein, the source end of the cable passes through a bottom wall of the lower chamber and is sealed to the bottom wall such that the cable is substantially vertically tethered to the bottom wall at a position that is substantially central and opposite to the window, and wherein the cable is tensioned by the floatation collar submerged in and buoyed by the liquid, such that the cable is substantially straight, and long enough such that the exit end of the cable is in close proximity to the window, where the exit end of the cable is buoyed, therein seeking a lowest pressure point;

wherein the light source delivers light to the source end of the cable, the cable conveys the light to the exit end, and the emitting light projects a point light at the window;

wherein, the upper chamber: has a ceiling wall opposite the window and in the upper chamber, and preferably in the ceiling wall, is located the observing means that can detect the exact planar position of the point light, and, optionally, can generate an appropriate electronic signal that describes the position, whereas, when the apparatus experiences an effective tilt, the lowest pressure point shifts, and the cable adjusts its angle to the new low pressure point, which accordingly causes the point light to move to a new position, and the new position is detected by the observing means.

A mechanistic description of the invention follows below. The flotation collar buoys the cable. The cable, which is tethered to the bottom, is flexible, and pulled straight by the buoyant flotation collar. The liquid generates a pressure that increases as the depth increases. The pressure forces the flotation collar upward, because the flotation collar is pushed by the higher pressure to a position of lower pressure. The tether restrains the flotation collar and the exit end of the cable from moving to a point against the window. The exit end is close enough to the window that the light emanating from the cable can be seen through the, window. The invention is generally set up so that when the apparatus is orientated with no tilt, the exit end of the cable is located at the center of the window.

When the apparatus is tilted, the flotation collar moves to the new minimum pressure point. The overall pressure is slightly higher because the lower chamber holding the liquid causes the liquid to stack up higher, and the flotation collar shifts to this new position which is the new minimum pressure for that depth. The exit end of the cable, buoyed by the flotation collar always seeks the minimum pressure, and this is coincident with the true vertical.

The observing means enables the user to visually track the position of the point light. The eye portal or lens can be fitted with a grid or a gradient to help the user graphically measure the tilt. The gradient or grid can alternatively be on the window. A lined film laminated to the window would also provide the graphical reference marks. The preferred grid or gradient for visual observation has both scalar and polar coordinates, so that the direction and magnitude of tilt can be easily read or quickly calculated. A preferred initial set up is to have the point light centered at a zero x and zero y when the apparatus is not tilted.

The observing means can also be the instrumental means, as for instance a digital camera, a photographic camera, a video camera, a stereo microscope or a photodetector. A video camera feed to a computer would have a presentation suitable for easy viewing and calculating.

The geometry of the instant apparatus has a number of advantages over the prior art. By using a tethered flotation collar, even small changes in tilt can be determined by extending the length of the cable from the flotation collar to the tether. A long cable would amplify the movement of the point light. Small angles will generate a larger arc, the further the plane of measurement is from the origin. For instance if the cable is 10 cm and the resultant is 1 cm, the magnitude of the tilt is 5.7 degrees. More examples are given in Table 1. The dimensions of the instant invention can be easily modified to accommodate whatever range of tilt is needed. Furthermore, a false tether can be created by immobilizing the cable above where the cable is actually tethered, and this would have the effect of using a shorter cable. For instance, if a 10 cm cable was immobilized 5 cm above the tether this would double the range of measurement. If more precision is required the false tether could be moved down.

TABLE 1

| Length of Cable (cm) | Length of Resultant (cm) | Magnitude of Tilt in Degrees |
| --- | --- | --- |
| 10 | 1 | 5.7 |
| 9 | 1 | 6.3 |
| 8 | 1 | 7.1 |
| 7 | 1 | 8.1 |
| 6 | 1 | 9.5 |
| 5 | 1 | 11.3 |
| 4 | 1 | 14.0 |
| 3 | 1 | 18.3 |
| 2 | 1 | 26.3 |
| 1 | 1 | 45.0 |

Another advantage of the invention is that, unlike bubble tubes, there is no gas, and the buoyant element never contacts anything but the liquid, therein eliminating problems associated with gas—liquid interfacial interactions.

The light source for the preferred invention is a light emitting diode, commonly known as an LED. The LED is selected so that it has good transmission properties through the cable, and is easily seen by the observing means. Generally, the preferred frequency is in the invisible spectrum. If the observing means is a photodetector, then the photodecter and LED are selected so as to optimize the response of the photodetector.

The preferred cable for the invention is a fiber optic cable, and preferably a bundle fiber optic cable. A fiber optical cable having good transmission characteristic in the visible range is preferred.

The preferred flotation collar for most applications is a hollow sphere, wherein the cable pass through the center of the sphere and protrudes, slightly, on the opposing side. The cable is sealed to the sphere with an air tight seal, where said seal is symmetrical and smooth. The sphere is suitably constructed to have a precise shape and to retain its shape, even under slight hydraulic pressure. The sphere is uniform in all directions and has a minimum surface area for a given volume.

The preferred liquid is pure water, and preferably degassed, distilled, deionized water. The water can, optionally, contain anti-freeze compounds, such as ethylene glycol, propylene glycol and alcohols. Certain metal salts can also be added to lower the freezing point. Salts have the benefit of also increasing the solution density. The water can optionally contain surfactants to lower the surface tension. The surfactants can be either ionic or nonionic. Fluorinated surfactants are excellent for lowering the surface tension. Other liquids that are commonly employed in tilt corrective instruments, like compasses, where the compass floats in a reservoir of the liquid, use high boiling organic compounds that are fluids. High boiling organic liquids have generally not been found to be required for the instant invention, albeit could be also employed if circumstances justified their use.

The upper chamber is preferably completely dark, except for the point light source. In a variation of the invention, two chambers are cylindrical in shape and have a nested configuration, wherein the upper chamber has a side wall that extends down to a base, where the side wall of the upper chamber encase the lower chamber. In essence the lower chamber is nested inside the upper chamber. The nested configuration creates an inter-wall space that has a Dewar insulating effect, and in general protects the lower chamber from the environment.

The preferred observing means of the invention is the photodetector, where the photodetector has an array of sensors which are mounted in the ceiling of the upper chamber. There are preferably a set of a pair of sensors mounted in a plane parallel to the window, and positioned such that one pair, designated an x pair, are orthogonal to other pair, designated the y pair. The sensors are located equidistant from each other and near the perimeter of the window. The x pair is part of a circuit containing a balanced Wheatstone bridge circuit, and the circuit generates an x axis signal. The y pair are part of a similar balanced Wheatstone bridge circuit and the similar circuit generates a y axis signal. The sensors are the photoconductive type, wherein their resistance is a function of luminance.

The relationship concerning how the electrical signal correlates to an intensity and spatial coordinates, and how the electrical and/or analog signal have a voltage and a sign that correlates to a direction and magnitude of tilt can be illustrated by an example.

The upper chamber side of the window has a treated surface, such that the treated surface diffuses the emitted light, therein making light emanating from the window isotropic. The sensors are sufficiently offset from the window that, even when the point light is in an extreme peripheral position of the window, all the sensors can see the point light. The photodetector senses the position as follows.

The x pair of sensors are tuned such that when the orientation device is aligned with the true vertical, the exit end of the cable, and therein the point light, is in the center of the window, and the x axis signal, which is measured as a voltage, is zero. The signal is zero because both sensors in the x pair are seeing the same intensity of light, as they are equidistant from the point light. The same is true for the y axis signal. When the orientation device is tilted, for the sake of the discussion, such that the direction of tilt is 225 degrees and the magnitude of tilt is 5.37 degrees (or 5 degrees and 22 minutes), then the exit end of the cable, and therein the point light will move to a new position in the window that compensates for this angle of tilt. The Wheatstone bridge is now out-of-balance and generates a commensurate analog signal, which in this case is a voltage for the x axis and a voltage for the y axis. In this hypothetical case the signal is 2 volts for the x axis and 2 volts for the y axis signal. The new position of the point light is in the first quadrant, 1 cm along the x axis and 1 cm along the y axis. The shift in spatial coordinates correlates to a direction and also correlates to a magnitude Using the Pythagorean theorem we calculate that the resultant is 1.41 cm long, and from the arctangent we calculate the angle is 45 degrees. The direction is opposite the direction of tilt, or 180 degrees out of phase. The phase shift can be compensated for by adding 180 degrees, making the direction 225 degrees (45+180), or preferably, by setting up the Wheatstone bridge so that the signal compensates for the phase shift. With the latter set up, the Wheatstone bridge signal for the hypothetical case would be −2 volt for the x axis and −2 volts for the y axis. Therein, unambiguously, indicating that the direction of tilt is in the third quadrant, and is 225 degrees. The magnitude is calculated by taking the arctangent of the resultant divided by the window–tether length, or 5.37 degrees $\tan^{-1}$ (1.41/15.00).

It is anticipated that it may be preferable to set the circuit up so that the signal is offset, or so that the sign of the signal be reversed. It is also anticipated that the signal can be analog or digital. The foregoing hypothetical case was designed merely to be illustrative that the detector can generate a signal that correlates to spatial coordinates.

The sensors of the photodetector can be photoconductive cells, photodiodes, or phototransistors. Photoconductive cells are preferred sensors for Wheatstone balance bridge circuits.

It is anticipated that under some circumstances it may be desirous to change the response to tilt, and the fluid mechanics of the invention will favor another shaped flotation collar, or a liquid of different density or viscosity. For instance a larger sphere weighted to have no net increase in buoyancy would move slower through the liquid because of increased fluid drag. Expanding on that idea, the sphere could be symmetrically fitted with fins that would create even more drag. A flotation collar having a mushroom shape might be more sensitive to small changes in pressure and could have a faster response. A liquid. having a lower viscosity would tend to have a faster response than a higher viscosity liquid. A liquid having a higher density would have a faster response, if the viscosity were substantially the same. For example, contrast pure water versus water loaded with metal salts. The water with metal salts could have a much higher density, and the same flotation collar would be much more buoyant.

It is further anticipated that the apparatus is maintained with some temperature control, to improve reproducibility, and to ensure that the orientation device is not damaged. Under some severe weather circumstances the liquid could expand or contract enough to damage the apparatus. For instance if pressure increased within the chamber the effect of gravity would be diminished, and if pressures became high enough the flotation collar would collapse. When the invention is used outdoors it is fitted with a protecting housing such that there is some temperature control and protection from the elements. It is anticipated that the instant invention could be fitted with pressure release plugs or diaphragms. The preferred invention has a machined recess covered with a flexible diaphragm to allow for pressure changes in the liquid. The machined recess acts as a small expansion chamber.

It is anticipated that the invention can be used under static conditions and under dynamic conditions. In general, static conditions are those where it is experiencing negligible acceleration other than gravity, and dynamic conditions refer to those wherein other forces are significant. An example of the latter, is when the orientation device is experiencing is significant angular velocity. Under these conditions, the forces can be resolved, as gravity is constant.

It is anticipated that the invention can be fitted with a timing mechanism such changes in orientation can be correlated to a finite time period.

BRIEF DESCRIPTION OF THE DRAWINGS

The invention is shown with no tilt.

DETAILED DESCRIPTION OF THE PREFERRED ILLUSTRATED EMBODIMENT

Figure 1:
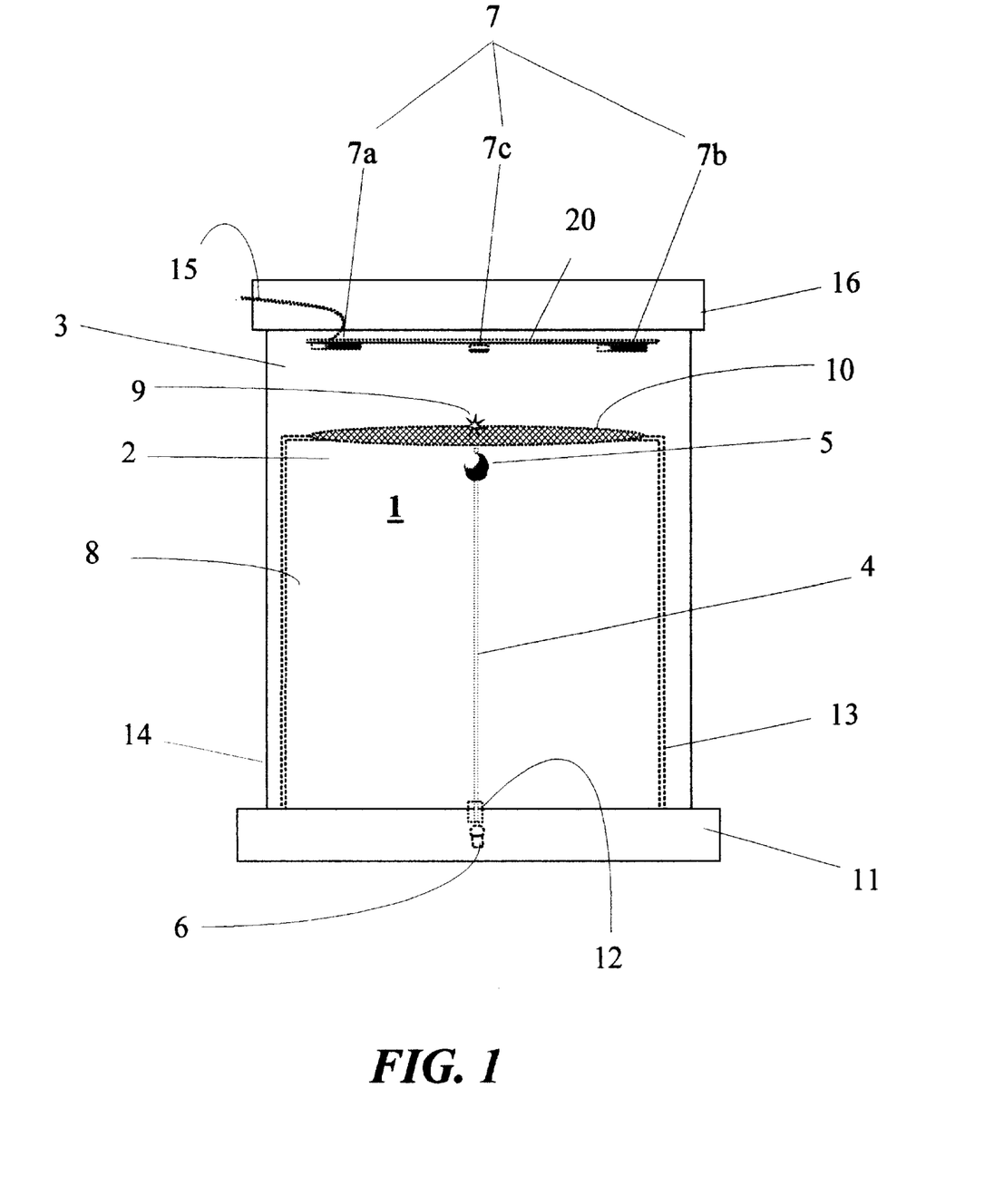
FIG. 1 is a side view of the invention, wherein the interior elements are shown in ghost.
Figure 3:
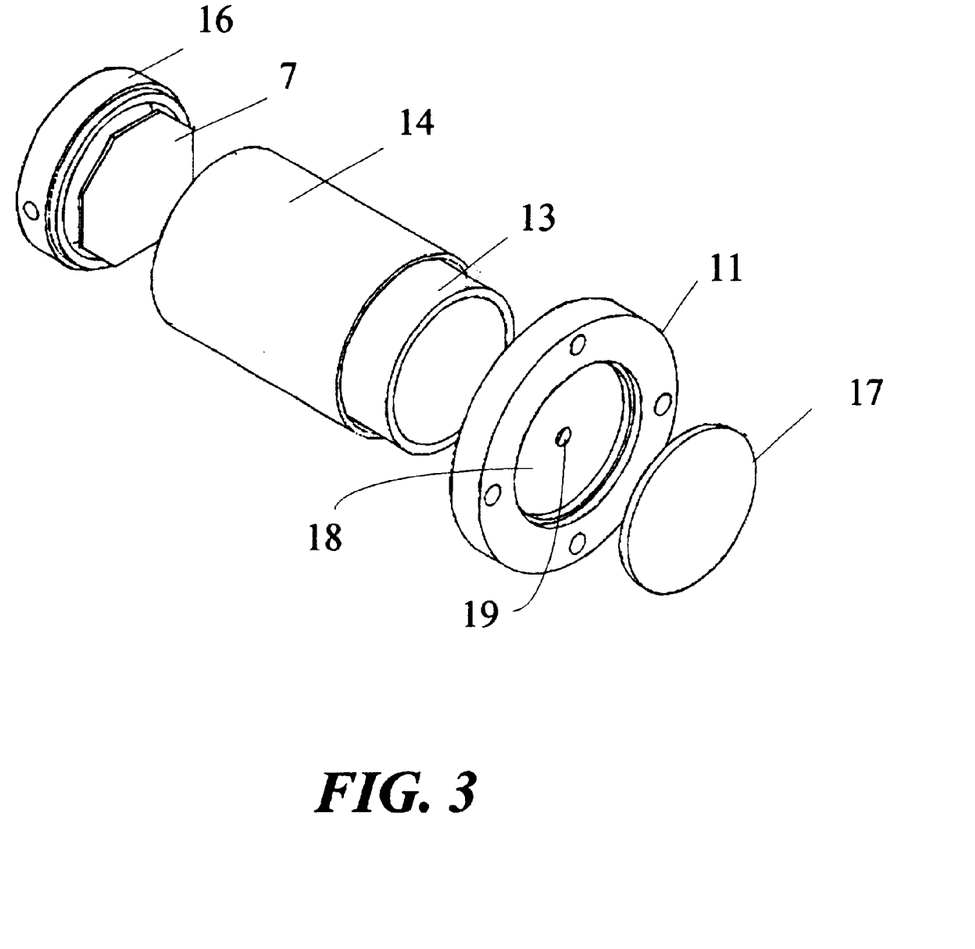
FIG. 3 is perspective exploded view of the orientation device.

A preferred embodiment of the orientation device 1 is shown in FIG. 1. The apparatus is shown from a side view, and the working elements are shown in ghost. There is a lower chamber 2, and superimposed on the lower chamber is an upper chamber 3. In the embodiment shown in FIG. 1, both the lower chamber 2 and the upper chamber 3 are cylindrical, so that in effect there is a chamber within a chamber. The side wall of the cylindrical lower chamber is labeled 13, and the side wall of the cylindrical upper chamber is labeled 14. The side walls of both chambers rest on a base 11. The top of the lower chamber has a window 10, where this window accounts for most of the floor of the upper chamber. The topside of the window is treated so that light emanating from the window is diffused, and is isotropic. Above the window 10 there is approximately 25 mm of head space. Diffusing the light has the effect of taking light that is focused into a beam, and spreading it out, so that the light appears more like a point of light, with light emanating in all directions, versus a beam of light that would be focused in one direction. An analogy would be a spotlight versus a light bulb. The light bulb can be readily seen from any direction, while the spotlight is only bright in one direction. The lower chamber 2 is completely filled with a liquid 8. The liquid is a mixture of distilled, deionized water, ~90%, ethylene glycol, ~10%, and a fluorinated nonionic surfactant, ~0.002%. The inside dimensions of the lower chamber are 57.15 mm high and 53.97 mm in diameter. The upper chamber is 82.55 mm high and 60.20 mm in diameter. Miniaturized versions of the embodiment are anticipated. There is a fiber optic cable 4 extending upward from the base 11 to a point just short of contacting the bottom side of the window 10. The cable is tethered and sealed at 12, and extends into a sub-compartment 18 within the base 11. The source end of the fiber optic cable is coupled to an LED 6. Refer to FIG. 3 to see the sub-compartment 18, and also the socket 19 for the LED and the LED cover 17. The fiber optic cable 4 has a flotation collar located very near the exit end of the cable. The flotation collar is a 10 mm diameter sphere 5. The cable passes through the center of the sphere 5, which is hollow and protrudes out the opposite side, terminating in the exit end. In FIG. 1 the apparatus is not tilted, and the sphere, and hence the exit end of the cable are positioned in the center of the window. The top of the upper chamber 3 has a ceiling 16, to which is mounted the photodetector 7. The photodetector 7 consists of an array of photoconductivity sensors 7a–7d, that are mounted on a circuit board 20. The sensors are positioned above and on the periphery of the window. The sensors are combined electronically as pairs in a Wheatstone balanced bridge. Physically, individual sensors are at opposite ends, so that an x pair 7a and 7b detects light along the x axis, and the y pair 7c and 7d along the y axis. Just as in rectangular coordinates, the x pair is orthogonal to the y pair. The output signal from the photodetector is fed through wires 15.

Figure 2:
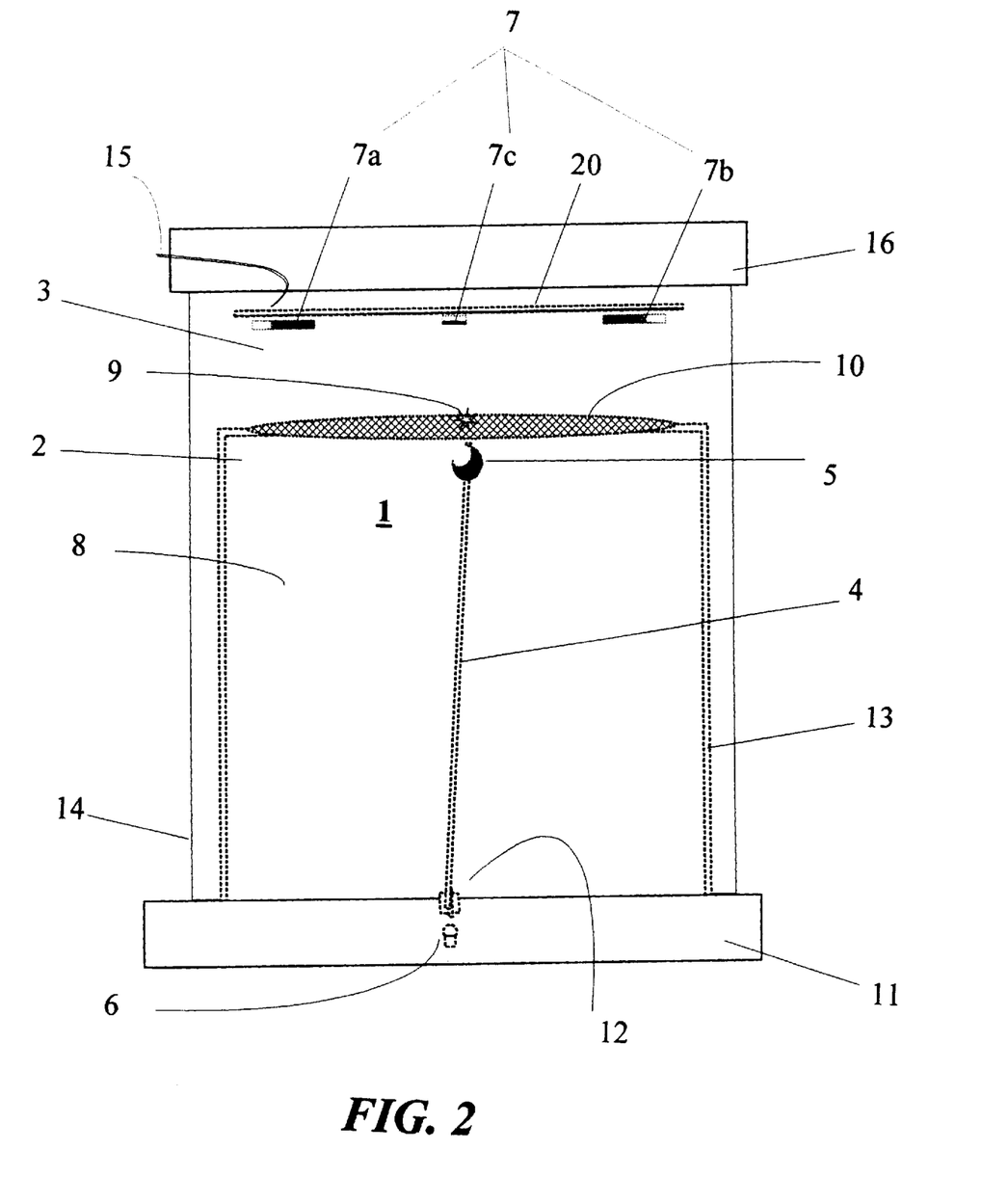
FIG. 2 is also a side view of the invention, wherein the interior elements are shown in ghost. The invention is tilted three degrees.

FIG. 2 is a view similar to FIG. 1, albeit the orientation device 1 is tilted. The magnitude of tilt is 3 degrees, and the direction is approximately 210 degrees. Note the position of the sphere and the exit end of the cable has shifted to the right in response to the tilt. The point light 9 has moved to the right about 3 mm.

Figure 4:
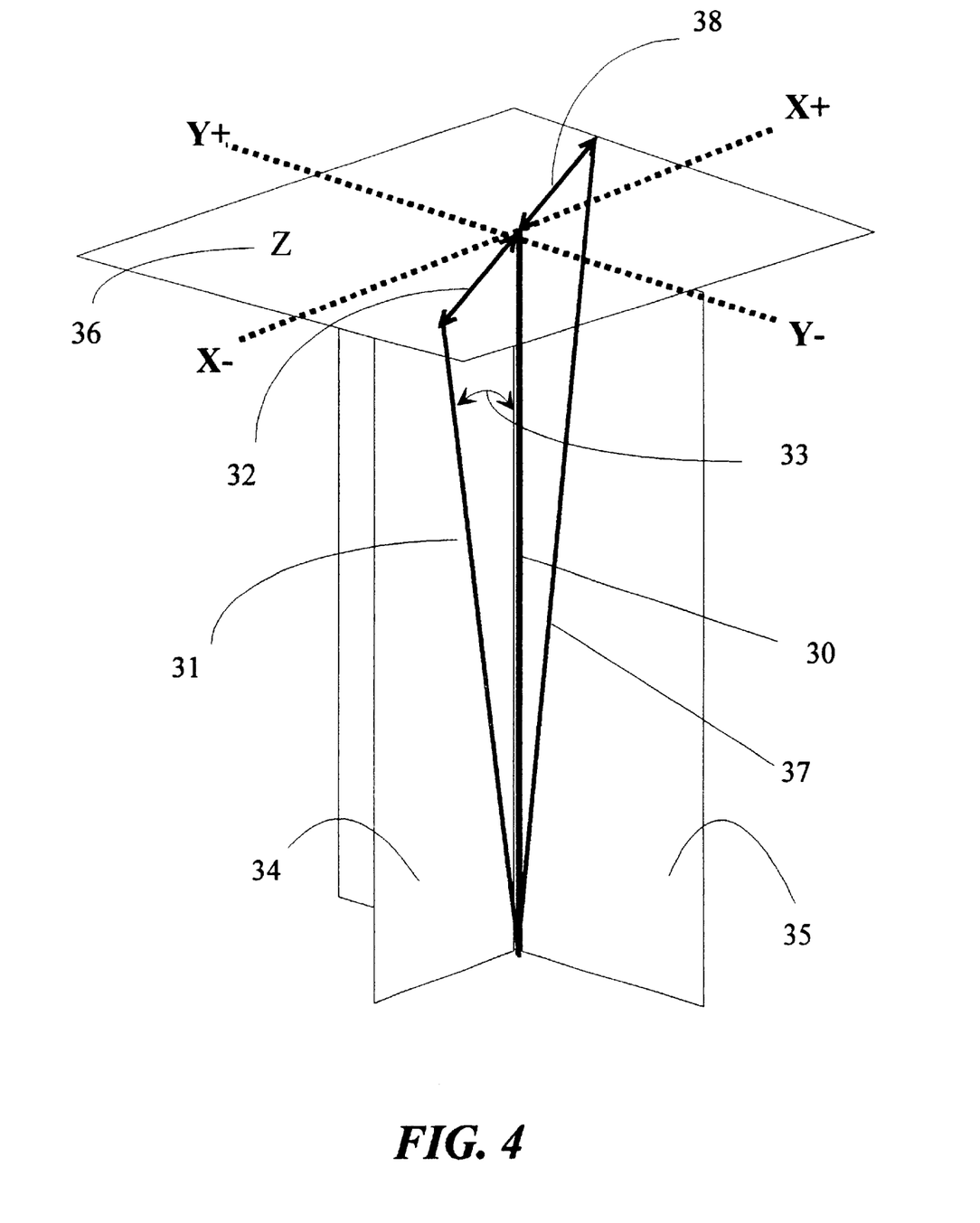
FIG. 4 is a diagrammatic view that depicts how the point light and cable move respective to a change in tilt.
Figure 5:
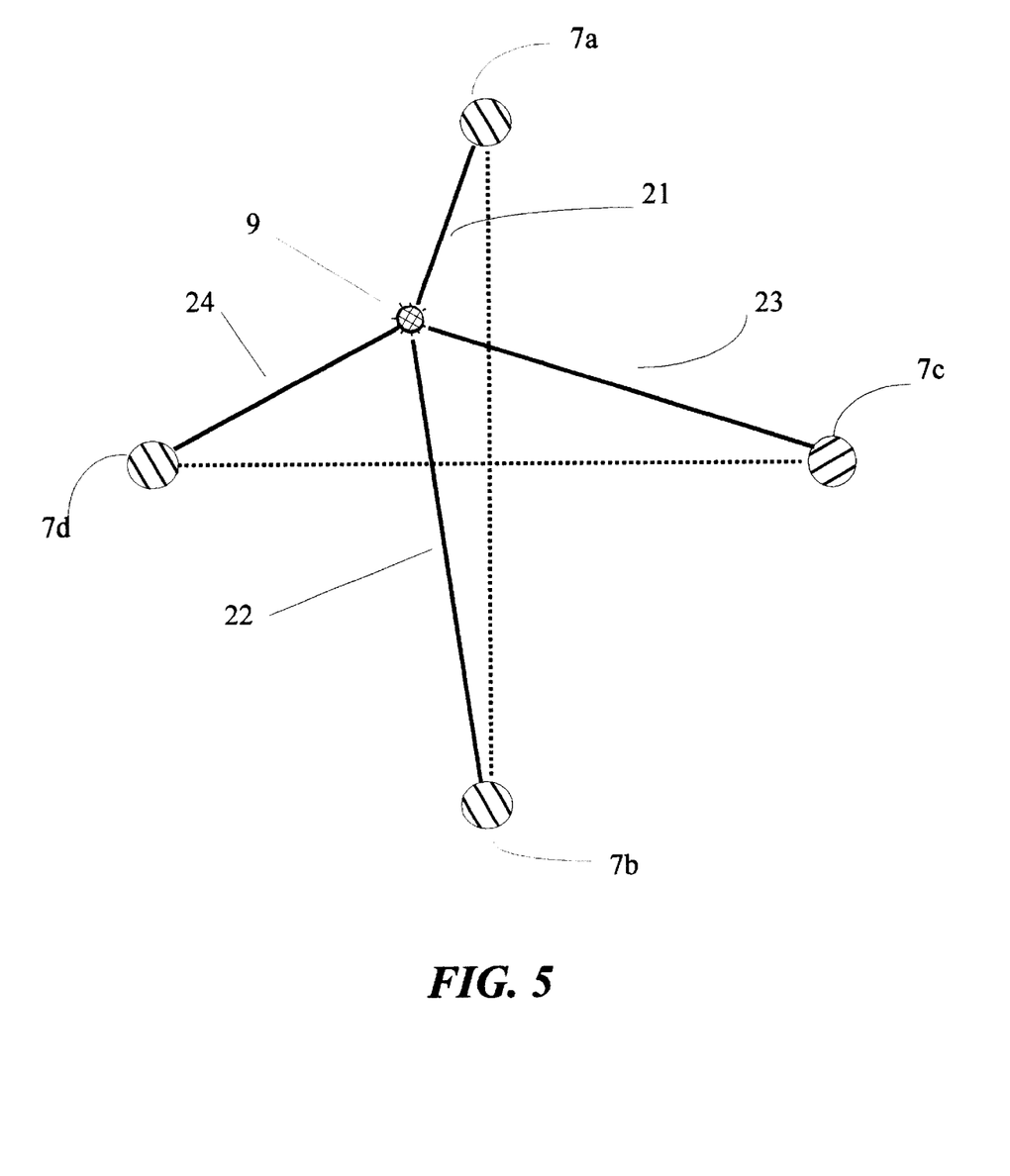
FIG. 5 is a diagrammatic view of the photodetector illustrating how the sensor array is able to determine position using light intensity.

Tilt, which is a three dimensional component, is defined in a two dimensional format using units of direction and: magnitude. The units can be expressed either in a scalar, an angular or a polar format. When observing an object that is tilted, the observer has to take into account his perspective. In the case of the instant invention, the photodetector 7, is the observer, and the perspective is substantially overhead. The perspective of the drawing shown in FIG. 2 is from the side, and so is not particularly useful for determining the direction of tilt. A better vantage position is shown diagrammatically in FIG. 4. The angular component of tilt is show by line 31, and the corresponding movement of the cable 4 is shown by line 37. FIG. 5 shows the perspective of the sensors 7a, 7b, 7c and 7d, as they see the point light 9. The point light 9 direction is 30 degrees, or 180 degrees out-of-phase with the tilt. As shown in FIG. 4 and FIG. 2, when the orientation device is tilted, the position of the point light 9 shifts from the center, the original true vertical 30, to a new true vertical 37. The direction of tilt is defined by the (y,x) position in the y plane 35 and the x plane 34. The magnitude 33 in the z plane 36 is calculated using the arctangent of resultant 38 divided by line 30. In the case of the illustrated embodiment, the length of 30 is constant, so the length of the resultant would have a corresponding angular value that could be pre-calculated and stored in a lookup table. Resultant 38 has the same length as line 32.

FIG. 5 diagrammatically depicts how the photodetector converts a photosensitivity property into tilt. Axial sensor pair 7a and 7b are photoconductivity cell sensors, and they are in half of a Wheatstone balanced bridge circuit. When the point light 9 is in the center of the window, then both sensors are seeing the same intensity of light because they are equidistant from the point light. The Wheatstone bridge is balanced because the resistance is equal and there is no voltage. In FIG. 5, the point light 9 is closer to sensor 7a than to sensor 7b, as indicated by the relative length of the scalar lines 21 and 22, where line 21 is the distance between the point light 9 and the sensor 7a, and line 22 is the distance between the point light 9 and the sensor 7b. Therefore the resistance of sensor 7a is less than the resistance of sensor 7b, and the Wheatstone bridge is unbalanced and there is a voltage increase. The magnitude of the voltage is a function of the relative resistance of the two sensors. If the point light were closer to sensor 7b, then the voltage would have an opposite sign, because the resistance for 7b would be lower that for 7a. The intensity or luminance that the sensor experiences is a function of how close the sensor is to the light. A condition of this relationship is that the light be isotropic. The same circuit is set up for sensors 7d and 7c for the y axis as indicated by the relative length of the scalar lines 23 and 24, where line 23 is the distance between point light 9 and sensor 7d, and line 24 is the distance between point light 9 and sensor 7c. Note, by comparing the results for the x axis and the y axis, a resultant 38 can be determined, and this correlates to a direction and magnitude.

Figure 6:
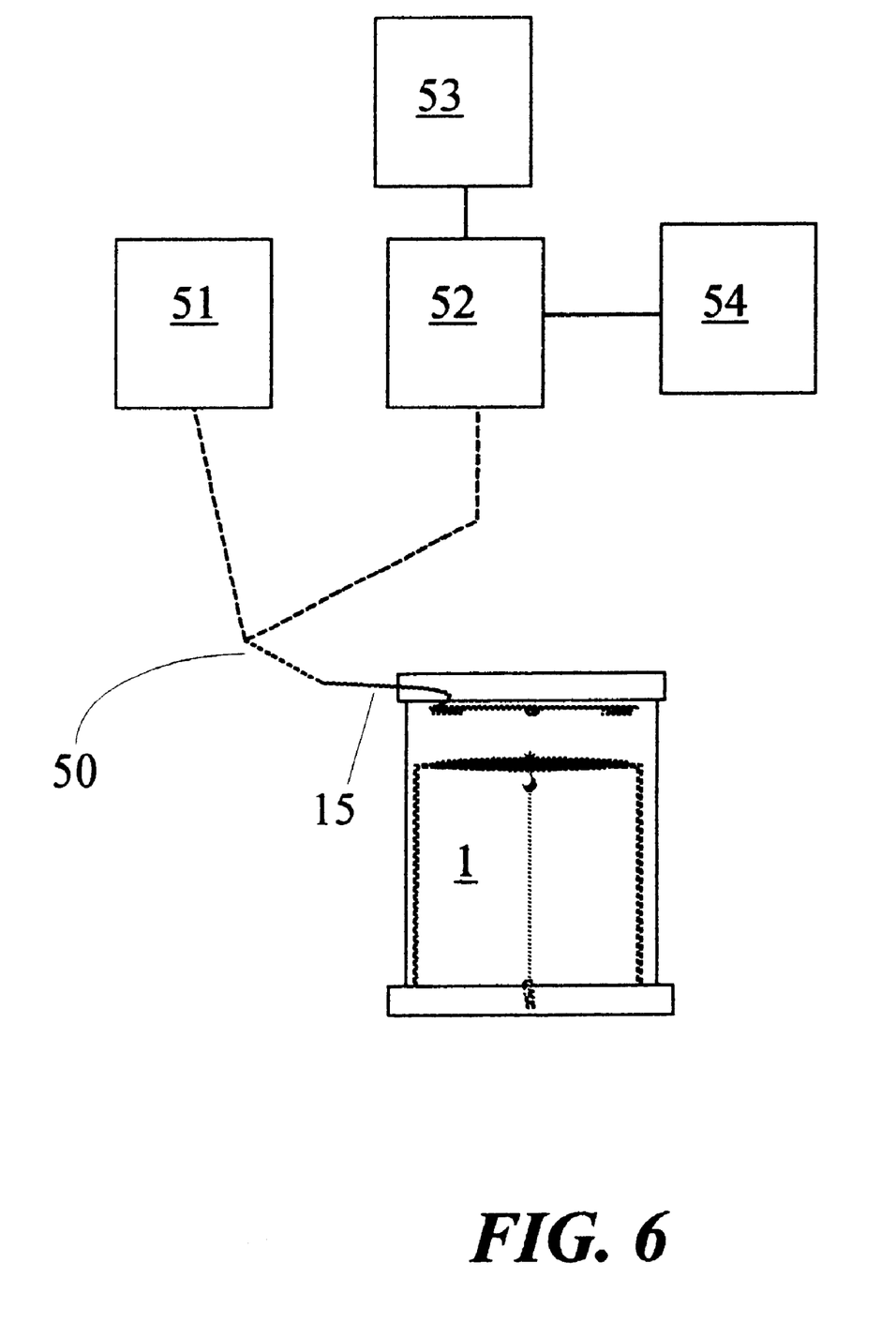
FIG. 6 is a diagrammatic view of the orientation sensor 1 in electrical communication with various auxiliary support devices, including an analog signal read out recorder 51, a computer 52 with a clock 53 and a CRT 54.
Figure 7:
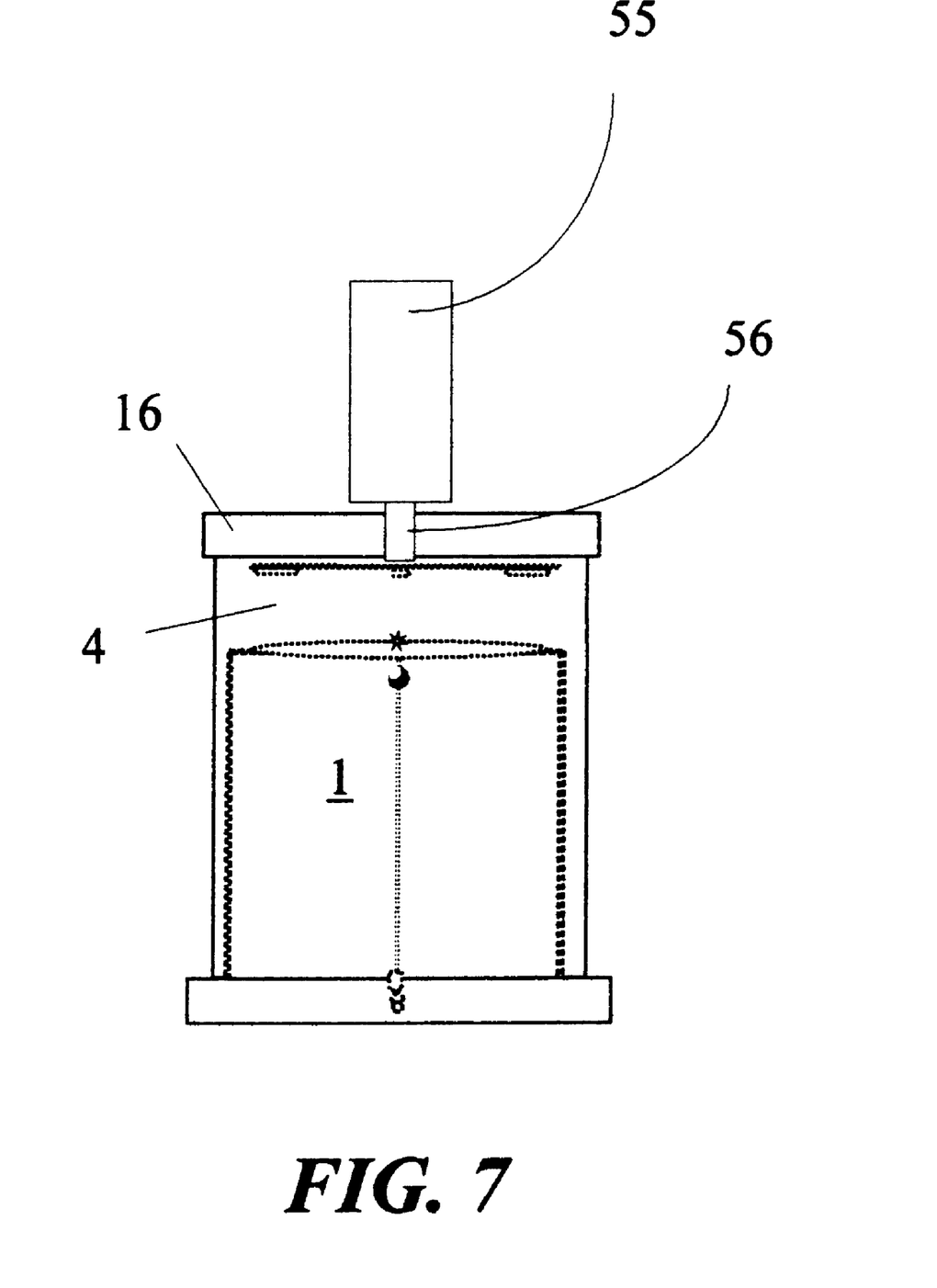
FIG. 7 is a diagrammatic view of the orientation sensor 1 with an observing means, for viewing access to upper chamber 4 through a portal 56 in the ceiling 16.

The circuit of the preferred embodiment generates an analog signal, so that there is a continuous readout out of the tilt. The orientation sensor 1 is in electrical communication through wire 15 with the read out device, and the output signal 50, as shown in FIG. 6, can be fed to an analog sensitive readout device such as a recorder 51, and to a digital device such as a computer 52. A number of options are available with the computer, which converts the analog signal to a digital signal. The tilt can be measured with respect to time using clock 53, and the calculation displayed, such as on a CRT 54, and data can be stored for further analysis. The signal lends itself to making dynamic determinations of the instantaneous tilt, which can tell the user a number of useful parameters about a system It is anticipated that the same concept can also be applied using other photodetector systems. For instance, an observing means 55, such as a camera or other similar photodector instrumental means, can be mounted such as to have visual access to the upper chamber 3 through a portal 56, such as a lens, as illustrated in FIG. 7. Under certain circumstances, for instances when the user wants to personally inspect the liquid 8 or the sphere 5, the preferred observing means would be a human eye.

What is claimed is:

1. An apparatus for determining the orientation with respect to gravity, wherein said apparatus comprising:
   a lower chamber that is filled with a liquid, and an upper chamber that is superimposed on the lower chamber, wherein said lower chamber and said upper chamber share a light communicating wall, wherein said light communicating wall is a window;
   a light transmitting cable that is transmitting light through the cable, wherein said cable has a source end which is an entrance point for the light, and an exit end that has an emitting light, and wherein said exit end is fitted with a flotation collar;
   a light source;
   a photodetector producing an electronic signal wherein said photodetector has a supporting electronic circuit, wherein said electronic signal correlates to an intensity and a spatial coordinate;
   wherein, the source end of the cable passes through a bottom wall of the lower chamber and is sealed to the bottom wall such that the cable is substantially vertically tethered to the bottom wall at a position that is substantially central and opposite to the window, and wherein the cable is tensioned by the floatation collar submerged in and buoyed by the liquid such that the cable is substantially straight, and long enough such that the exit end of the cable is in close proximity to the window;
   wherein the light source delivers light to the source end of the cable, the cable transmits the light to the exit end, and the emitting light projects a point light at the window;
   wherein, the upper chamber has a ceiling wall opposite the window, wherein on the ceiling wall is mounted the photodetector, wherein said photodetector is in a plane parallel to the window, wherein said electronic signal of the photodetector is specific to a position for the point light at the window;
   whereas, when the apparatus experiences an effective tilt, said tilt having both a direction and a magnitude, there is an equal and opposite response by the cable at the exit end, which causes the position of the point Light to move to a new position, and the photodetector detects the new position and therein generates a new electronic signal, wherein the intensity and spatial coordinates of the point light correspond to the magnitude and direction of tilt.

2. The apparatus as claimed in claim 1 wherein said photodetector is a light-detecting device or four or more sensors, wherein said sensors can be photoconductive cells, photodiodes, or phototransistors.

3. The apparatus as claimed in claim 2 wherein said sensors are symmetrically mounted in pairs on orthogonal coordinate axes, wherein a first pair of said sensors forms an x-axis, and a second pair of said sensors forms a y-axis of rectangular coordinate system, and each pair is electrically connected in a 'half' Wheatstone bridge circuit, such that the signal defines the position on the rectangular coordinate system.

4. The apparatus as claimed in claim 1, wherein said light source is a light emitting diode.

5. The apparatus as claimed in claim 1, wherein the preferred liquid for a fast response to tilt is a low viscosity liquid, wherein the viscosity is equal to or less than the viscosity of water.

6. The apparatus as claimed in claim 1, wherein the supporting circuit for the photodetector contains a temperature compensation component to electronically compensate for temperature changes.

7. The apparatus as claimed in claim 1, wherein the apparatus is housed in a temperature controlled environment.

8. The apparatus as claimed in claim 1, wherein said apparatus has an adjustable false tether, where said false tether enables the cable to have an adjustable effective length.

9. The apparatus as claimed in claim 1, wherein said window has a laminating film with a gradient printed on the film.

10. the apparatus as claimed in claim 1, wherein said cable is a fiber optic cable.

11. The apparatus as claimed in claim 1, wherein said flotation collar is a hollow sphere through which center the cable passes.

12. The apparatus as claimed in claim 1, wherein said window diffuses light passing through it, and causes it to be isotropic.

13. An apparatus according to claim 1, wherein said apparatus further comprises a clock.

14. An apparatus for determining the orientation with respect to gravity, wherein said apparatus comprising:

- a lower chamber that is filled with a liquid, and an upper chamber that is superimposed on the lower chamber, wherein said lower chamber and said upper chamber share a light communicating wall, wherein said light communicating wall is a window, and said window having an upper surface that is treated so as to diffuse a light and cause it to be isotropic;
- a fiber optic cable, wherein said cable has a source end which is an entrance point for the light, and an exit end which is an emitting end for said light, and wherein said exit end is fitted with a flotation collar;
- a light source;
- a photodetector comprising of at least two pairs of sensors which are equidistantly arranged in a circular configuration, wherein a first pair of said sensors are aligned along an abscissa coordinate, and a second pair of said sensors are aligned along an ordinate coordinate, wherein both pairs of said sensors produce an electronic signal, where a first electronic signal is an analog signal produced by a first Wheatstone balanced bridge circuit in which the first pair of said sensor are in the circuit, and the voltage and the sign of the signal is a function of the relative proximity to the point light, and the second electronic signal is produced by a second Wheatstone balanced bridge circuit generating a similar signal for the ordinate; whereby comparing the first electronic signal to the second electronic signal, a direction and magnitude of tilt can be determined;
- wherein, the source end of the cable passes through a bottom wall of the lower chamber and is sealed to the bottom wall such that the cable is substantially vertically tethered to the bottom wall at a position that is substantially central and opposite to the window, and wherein the cable is tensioned by the flotation collar submerged in and buoyed by the liquid, such that the cable is substantially straight, and long enough such that the exit end of the cable is in close proximity to the window;
- wherein the light source delivers light to the source end of the cable, the cable transmits the light to the exit end, and the emitting light projects a point light at the window;
- wherein, the upper chamber and the lower chamber are cylindrical and share a base, and the lower chamber is enclosed by the upper chamber creating a head space above the lower chamber, wherein the upper chamber has a ceiling wall opposite the window, wherein on the ceiling wall is mounted the photodetector, where said photodetector is in a plane parallel to the window;
- whereas, when the apparatus experiences an effective tilt, there is an equal and opposite response by the cable at the exit end, which causes the position of the point light to move to a new position, and the photodetector detects the new position and therein generates a new electronic signal, wherein the intensity and spatial coordinates of the point light correspond to the magnitude and direction of tilt.

15. The apparatus as claimed in claim 14, wherein said light source is a light emitting diode.

16. An apparatus for determining the orientation with respect to gravity, wherein said apparatus comprising:

- a lower chamber that is filled with a liquid, and an upper chamber that is superimposed over the lower chamber, wherein the lower chamber and the upper chamber share a light communicating wall, wherein said light communicating wall is a window;
- a light transmitting cable that is transmitting light through the cable, wherein said cable has a source end which is an entrance point for the light, and an exit end that has an emitting light, and wherein the exit end is fitted with a flotation collar;
- a light source;
- an observing means, wherein the observing means is a means for visually observing the emitting light;
- wherein the source end of the cable passes through a bottom wall of the lower chamber and is sealed to the bottom wall such that the cable is substantially vertically tethered to the bottom wall at a position that is substantially central and opposite to the window, and wherein the cable is tensioned by the floatation collar submerged in and buoyed by the liquid such that the cable is substantially straight, and long enough such that the exit end of the cable is in close proximity to the window, wherein the exit end of the cable is buoyed to seek a lowest pressure point;
- wherein, the light source delivers light to the source end of the cable, the cable transmits the light to: the exit end, and the emitting light projects a point light at the window;
- wherein, the upper chamber has a ceiling wall opposite the window and in the upper chamber, and preferably in the ceiling wall, is located the observing means that can detect the exact planar position of the point light, and, optionally, can generate an appropriate electronic signal that describes the position;
- whereas, when the apparatus experiences an effective tilt, the lowest pressure point shifts, and the cable adjusts its angle to the new low pressure point, which accordingly causes the point light to move to a new position, and the new position is detected by the observing means.

17. The apparatus as claimed in claim 16, wherein said light source is a light emitting diode.

18. The apparatus as claimed in claim 16 wherein said observing means is a human eye or an instrumental means, wherein the instrumental means is a means for mechanically observing the emitting light through a portal or a lens.

19. The apparatus as claimed in claim 18, wherein said instrumental means is a television, a video, a photographic, or a digital cameras or other light detecting device.

* * * * *